United States Patent [19]

Kaneko et al.

[11] 3,895,057

[45] July 15, 1975

[54] AMINOALKANOLS AND THEIR PHARMACEUTICALLY ACCEPTABLE ACID-ADDITION SALTS, AND PRODUCTION THEREOF

[75] Inventors: Hidehiko Kaneko, Minoo; Jiro Aritomi, Nara; Keiji Nakamura, Neyagawa, all of Japan

[73] Assignee: Dainippon Pharmaceutical Co. Ltd., Osaka, Japan

[22] Filed: Feb. 11, 1971

[21] Appl. No.: 114,710

Related U.S. Application Data

[63] Continuation-in-part of Ser. No. 766,297, Oct. 9, 1968.

[30] Foreign Application Priority Data

Oct. 13, 1967   Japan.............................. 42-65896
Oct. 13, 1967   Japan.............................. 42-65897

[52] U.S. Cl... 260/501.11; 260/501.18; 260/544 M; 260/558 R; 260/570 R; 424/316; 424/330
[51] Int. Cl.²........................................ C07C 91/16
[58] Field of Search...... 260/501.11, 501.18, 570 R; 424/330

[56] References Cited
UNITED STATES PATENTS

| | | | |
|---|---|---|---|
| 2,490,834 | 12/1949 | Rieveschl et al.................. | 260/570 |
| 3,152,173 | 10/1964 | Eherhart et al................. | 260/570 X |
| 3,450,763 | 6/1969 | Hofmann et al.................. | 260/570 |

FOREIGN PATENTS OR APPLICATIONS

1,526,188   4/1968   France................................. 260/570

OTHER PUBLICATIONS

Nakamura et al., "Chemical Abstracts", Vol. 71, pages 345–346 (1969).
Klosa, "Journal fur Praktische Chemie," Vol. 311, No. 3, pages 520–522 (1969).
Horii et al., "Chemical Abstracts," Vol. 64, page 5078 (1966).

*Primary Examiner*—R. V. Hines
*Attorney, Agent, or Firm*—Bierman & Bierman; Jordan B. Bierman; Linda G. Bierman

[57] ABSTRACT

Aminoalkanols of the formula:

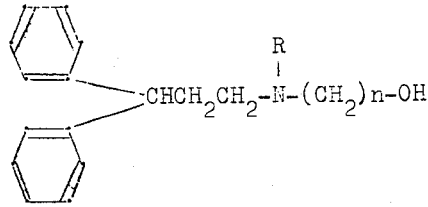

wherein R is hydrogen or alkyl having 1 to 4 carbon atoms and $n$ is an integer of 1 to 4, which are useful as anti-depressants.

1 Claim, No Drawings

AMINOALKANOLS AND THEIR PHARMACEUTICALLY ACCEPTABLE ACID-ADDITION SALTS, AND PRODUCTION THEREOF

This application is a continuation-in-part of copending application Ser. No. 766,297, filed Oct. 9, 1968.

The present invention relates to aminoalkanols and their pharmaceutically acceptable acid-addition salts, and production thereof.

The said aminoalkanols are representable by the formula:

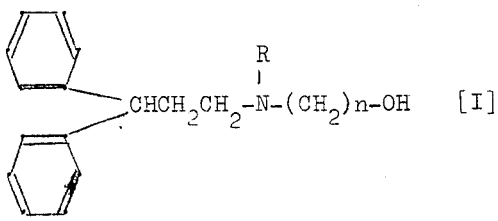

wherein R is hydrogen or alkyl having 1 to 4 carbon atoms (e.g. methyl, ethyl, propyl, isopropyl, butyl) and $n$ is an integer of 1 to 4:

As the pharmaceutically acceptable acid-addition salt of the aminoalkanol [I], there may be exemplified the following salts: hydrochloride, sulfate, nitrate, acetate, propionate, oxalate, tartrate, malonate, malate, maleate, citrate, lactate, gluconate, aspartate, glycolate, phenylacetate, etc.

The aminoalkanols [I] and their pharmaceutically acceptable acid-addition salts are useful as antidepressants. They are also useful as intermediates in the preparation of the esters disclosed in U.S. Pat. No. 3,700,680.

In accordance with the present invention, the aminoalkanol [I] is prepared by condensing a compound of the formula:

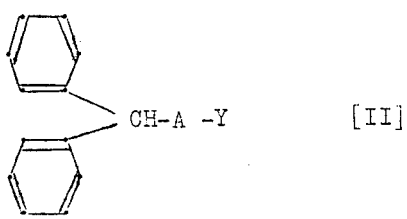

wherein A is methylenecarbonyl or ethylene and Y is a group reactive with a group hereinafter represented by the symbol Z to leave a moiety of the formula:

in which R is as defined above in the resulting product with a compound of the formula:

$$Z-(CH_2)n-OH \quad [III]$$

wherein $n$ is as defined above and Z is a group reactive with a group hereinbefore represented by the symbol Y to leave a moiety of the formula:

in which R is as defined above in the resulting product; when A is methylenecarbonyl, reducing the resulting product with a reducing agent; and, when R is hydrogen, optionally reacting the resulting product with an alkylating agent.

Some of the concrete procedures fallen within the category of the above process are illustrated below.

Procedure 1

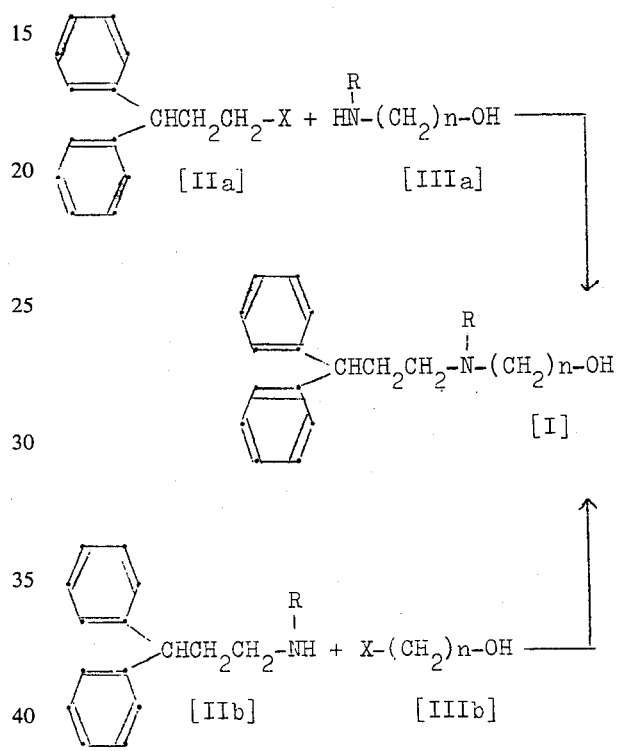

wherein R and $n$ are each as defined above and X is halogen (e.g. chlorine, bromine).

As shown in the above scheme, the procedure consists of condensation. The condensation may be carried out by reacting the alkyl halide [IIa] with the alcohol [IIIa] or the amine [IIb] with the alcohol [IIIb], preferably in a solvent (e.g. methanol, ethanol, benzene, toluene, xylene) at a temperature from 100° to 200°C, if needed, in a sealed tube or an autoclave. The reaction is normally accomplished within several hours.

Procedure 2

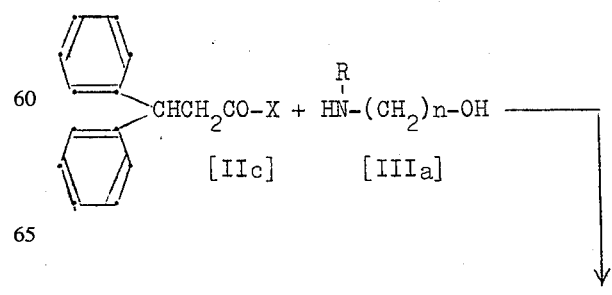

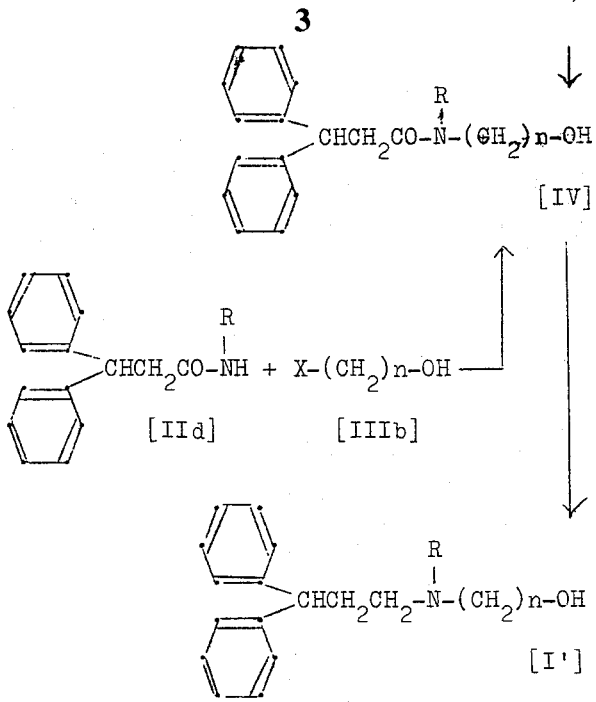

wherein R, n and X are each as defined above.

As shown in the above scheme, the procedure consists of condensation and reduction. The condensation may be accomplished by reacting the alkanoyl halide [IIc] with the alcohol [IIIa] or the amide [IId] with the alcohol [IIIb] in a solvent (e.g. chloroform, carbon tetrachloride), preferably in the presence of a base (e.g. triethylamine, pyridine) while cooling with ice for several hours. The subsequent reduction may be executed by treating the amide [IV] with a reducing agent conventionally employed for conversion of an amide carbonyl group into a methylene group (e.g. lithium aluminum hydride, borane) in an inert solvent (e.g. dioxane, diglyme, tetrahydrofuran), usually at a temperature from room temperature to 120°C. The reaction is ordinarily accomplished within several to 20 hours.

formalin, excess of formic acid serves as a solvent. When alkyl iodide is the reagent, acetone, methanol or ethanol are examples of the preferred solvent. For dialkyl sulfate, the reaction medium may be made of ether, chloroform, benzene or the like in an alkaline condition.

In the above procedures, the objective aminoalkanol [I] is obtained in the form of free base or acid-addition salt. When the product is in the salt form, it can be converted into the free base form by a conventional method, e.g. treatment of the former in chloroform with an aqueous solution of sodium carbonate. The treatment of the free base with an organic or inorganic acid (e.g. acetic acid, oxalic acid, malonic acid, tartric acid, malic acid, citric acid, lactic acid, gluconic acid, aspartic acid, hydrochloric acid, sulfuric acid, nitric acid) in a suitable solvent (e.g. water, methanol ethanol) affords the corresponding acid-addition salt.

As hereinbefore stated, the aminoalkanols [I] and their pharmaceutically acceptable acid-addition salts are useful as anti-depressants. Some of the test results by which such utility is confirmed are described below.

TEST 1

Antagonistic action against reserpine effects:

A. Antagonism to hypothermia. Groups of dd strain mice weighing 18 to 20 g, each group consisting of 5 animals, received intraperitoneally 5 mg of reserpine and orally 0.5 to 100 mg of the test compound per kg of body weight. After 4 hours, the rectal temperature was measured by an electric thermometer, and the $ED_{50}$ value (the effective dose which showed 50 percent recovery of the depression caused by reserpine) was determined.

B. Antagonism to reserpine ptosis. Groups of mice weighing 18 to 20 g, each group consisting of 10 animals, received intraperitoneally 10 mg of reserpine and orally 2 to 100 mg of the test compound per kg of body weight. The ptosis induced by reserpine was observed with elapse of time, and the $ED_{50}$ value (the effective dose which showed 50 percent control of the ptosis induced by reserpine) was determined.

Procedure 3

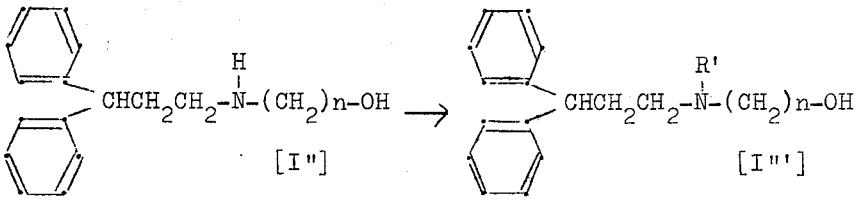

wherein n is as defined above and R' is alkyl having 1 to 4 carbon atoms (e.g. methyl, ethyl, propyl, isopropyl, butyl).

As shown in the above scheme, the procedure consists of alkylation. The alkylation may be executed by treating the aminoalkanol [I″], prepared by either one of the procedures 1 and 2, with an alkylating agent (e.g. formic acid-formalin, alkyl iodide, dialkyl sulfate), usually at a temperature from 20° to 100°C. If necessary, a suitable solvent may be used depending on the kind of the alkylating agent. In the case of using formic acid- C. Antagonism to lowering electroshock of threshold. Groups of mice weighing 18 to 20 g, each group consisting of 20 animals, received intraperitoneally 10 mg of reserpine and orally 2 to 100 mg of the test compound per kg of body weight. After 5 hours, the depression of the electroshock threshold caused by reserpine was observed, and the $ED_{50}$ value (the effective dose which showed 50 percent recovery of the depression caused by reserpine) was determined.

The results of the above tests are shown in the following table:

| Test compound | ED$_{50}$ (mg/kg) | | |
|---|---|---|---|
| | Anti-hypothermia | Anti-ptosis | Anti-electroshock |
| 3-[N-3,3-Diphenyl-propyl)-N-methylamino]-propan-1-ol hydrochloride | 15.1 | 6.0 | 41.0 |
| Imipramine | 41.5 | 127.0 | 140.0 |

TEST 2

Potentiation of pentetrazole convulsion:

Groups of dd strain mice weighing 18 to 20 g, each group consisting of 5 animals, received orally 100 mg of the test compound per kg of body weight. After 2 hours, the non-convulsive dose (50 mg/kg) of pentetrazole was intraperitoneally administered, and the convulsion or death of animals was observed.

The results of the test are shown in the following table:

| Test compound | Convulsion | Death |
|---|---|---|
| 3-[N-(3,3-Diphenyl-propyl)-N-methylamino]-propan-1-ol hydrochloride | 5/5 | 0/5 |
| Imipramine | 0/5 | 0/5 |
| Control | 0/5 | 0/5 |

TEST 3

Potentiation of yohimbine convulsion:

Groups of dd strain mice weighing 18 to 20 g, each group consisting of 5 animals, received orally 100 mg of the test compound per kg of body weight. After 2 hours, the non-convulsive dose (30 mg/kg) of yohimbine was subcutaneously administered, and the convulsion or death of animals was observed.

The results of the test are shown in the following table:

| Test compound | Convulsion | Death |
|---|---|---|
| 3-[N-(3,3-Diphenyl-propyl)-N-methylamino]-propan-1-ol hydrochloride | 5/5 | 1/5 |
| Imipramine | 5/5 | 1/5 |
| Control | 0/5 | 0/5 |

The toxicity of the aminoalkanols [I] and their pharmaceutically acceptable acid-addition salts is considerably low. In the acute toxicity, for instance, the LD$_{50}$ values of 3-[N-(3,3-diphenylpropyl)-N-methylamino]-propan-1-ol hydrochloride when intraperitoneally and orally administered to mice were respectively 116.6 and 746.5 mg/kg, while those of imipramine were respectively 104.5 and 490 mg/kg.

The aminoalkanols [I] and their pharmaceutically acceptable acid-addition salts can be administered by conventional methods, conventional types of unit dosages or with conventional pharmaceutical carriers to produce an anti-depressing effect in human beings and animals. Thus, they can be used in the form of pharmaceutical preparations, which contain them in admixture with a pharmaceutical organic or inorganic carrier material suitable for enteral or parenteral applications. Oral administration by the use of tablets, capsules, powders or in liquid form such as suspensions, solutions, emulsions or syrups is particularly advantageous. When formed into tablets, conventional excipients (e.g. sodium citrate, lactose, microcrystalline cellulose, starch), lubricating agents (e.g. anhydrous silicic acid, hydrized castor oil, magnesium stearate, sodium lauryl sulfate, talc) and binding agents (e.g. starch paste, glucose, lactose, gum acacia, gelatin, mannitol, magnesium trisilicate, talc) used in therapeutic unit dosages can be employed. When administered as liquids, conventional liquid carriers can be used. For intravenous or intramuscular injection, those in acid-addition salt form, particularly hydrochlorides, are employed after dissolving in water, if necessary, followed by buffering or making isotonic with glucose, saline or the like.

The unit dosage or therapeutically effective quantity of the aminoalkanols [I] and their pharmaceutically acceptable acid-addition salts for human beings can vary over wide limits such as that of about 0.1 to about 1500 mg. It is indicated from animal experiments that about 0.5 to about 800 mg, more preferably about 10 to about 500 mg, of the therapeutic agent per kg of body weight is a suitable daily dose for human adult. The dosage of the particular therapeutic agent used can vary considerably, such as the age of the patient and the degree of therapeutic effect desired. In the case of solid preparations, each unit dosage form of the therapeutic agent can contain from about 50 to about 95 percent of the same by weight of the entire composition with the remainder comprising conventional pharmaceutical carriers. When the therapeutic agent is used as aqueous solution, i.e. injection, the solution may contain about 0.05 to about 0.5 percent of the same by weight of the entire solution. Of course, it is possible to administer the therapeutic agent, i.e. the pure compound, without the use of any pharmaceutical carrier.

Practical and presently-preferred embodiments of the present invention are illustratively shown in the following Examples.

EXAMPLE 1

A. In a sealed tube, a mixture of 1-chloro-3,3-diphenylpropane (2.5 g), 3-aminopropan-1-ol (1.0 g) and ethanol (20 ml) is heated at 130°C for 6.5 hours. After removal of the ethanol from the reaction mixture, the residue is dissolved in benzene, washed with water and extracted with 5 percent hydrochloric acid and water in order. The washing water, the hydrochloric acid extract and the water extract are combined together, made alkaline with sodium hydroxide and extracted with benzene. The benzene extract is washed with water, dired over anhydrous sodium sulfate and concentrated to give 3-(3,3-diphenylpropylamino)-propan-1-ol (2.5 g). M.P. 88° to 90°C.

The starting 1-chloro-3,3-diphenylpropane is prepared as follows: 3,3-diphenylpropan-1-ol (13.8 g) is dissolved in benzene (40 ml), admixed with thionyl chloride (20 g) and refluxed for 1 hour; excess of thionyl chloride is distilled off; and the resultant is distilled under reduced pressure to give an oil (12.0 g) boiling at 146° to 147°C/4 mmHg.

B. In a sealed tube, a mixture of 3,3-diphenylpropylamine (5 g), 3-chloropropan-1-ol (1.6 g) and ethanol (20 ml) is heated at 130°C for 8 hours. The reaction mixture is treated as in (A) to give 3-(3,3-diphenylpropylamino)-propan-1-ol (3 g).

EXAMPLE 2

A mixture of 3,3-diphenylpropionic acid (45 g) in thionyl chloride (40 ml) is refluxed for 2 hours to remove excess of thionyl chloride. The obtained 3,3-diphenylpropionyl chloride is dissolved in chloroform (100 ml), and the resultant solution is dropwise added to a cooled mixture of ethanolamine (30 g), triethylamine (35 g) and chloroform (150 ml) while stirring. The reaction mixture is allowed to stand overnight. The precipitate is collected by filtration, washed with water and recrystallized from benzene (100 ml) to give 2-(3,3-diphenylpropionylamino)ethan-1-ol (31.5 g). M.P. 91° to 93°C.

To a suspension of lithium aluminum hydride (4.5 g) in dioxane (100 ml), a solution of 2-(3,3-diphenylpropionylamino)ethan-1-ol (10 g) in dioxane (30 ml) is dropwise added and the resultant mixture is stirred at room temperature for 2 hours and refluxed for 12 hours. To the reaction mixture cooled with ice, there is dropwise added water (9 ml), and the resulting mixture is warmed for 1 hour. The precipitate is collected by filtration and washed with dioxane. The filtrate and the washing dioxane are combined and concentrated under reduced pressure to give 2-(3,3-diphenylpropylamino)-ethan-1-ol (9.5 g). M.P. 74° to 76°C. The compound is admixed with an ethanolic solution of hydrochloric acid and concentrated under reduced pressure to give the hydrochloride. M.P. 154.5° to 155.5°C.

In the similar manner, 3-(3,3-diphenylpropylamino)-propan-1-ol is obtained from 3-(3,3-diphenylpropionylamino)-propan-1-ol prepared by reacting 3,3-diphenylpropionyl chloride with 3-aminopropan-1-ol. M.P. 88° to 90°C. The hydrochloride, M.P. 141.5° to 143.5°C.

EXAMPLE 3

A. To a solution of 3-(3,3-diphenylpropylamino)-propan-1-ol (1.0 g) in formic acid (2.5 ml), 37 percent formalin (2 ml) is added, and the resultant mixture is heated on a water bath for 5 hours. After addition of water (20 ml), the reaction mixture is made alkaline with sodium carbonate and shaken with benzene. The benzene layer is washed with saturated sodium chloride solution, dried over anhydrous sodium sulfate and concentrated. The residue is admixed with an ethanolic solution of hydrochloric acid and concentrated under reduced pressure. The residue is dissolved in acetone, admixed with ether and allowed to stand. The precipitated crystals are collected by filtration to obtain 3-[N-(3,3-diphenylpropyl)-N-methylamino]propan-1-ol hydrochloride (0.9 g). M.P. 95° to 102°C.

B. A mixture of 3-(3,3-diphenylpropylamino)propan-1-ol (1.5 g) and methyl iodide (1.5 g) in ethanol (6 ml) is heated on a water bath while refluxing for 1 hour. After removal of the solvent, the crystalline residue is recrystallized from ethanol to give 3-[N-(3,3-diphenylpropyl)-N-methylamino]propan-1-ol hydroiodide (0.9 g). M.P. 182° to 184°C.

C. To a solution of 2-(3,3-diphenylpropylamino)-ethan-1-ol (2.0 g) in formic acid (7 ml), formalin (7 ml) is added, and the resultant mixture is heated on a water bath for 3 hours. After cooling, the reaction mixture is admixed with water (20 ml), made alkaline with sodium carbonate and shaken with benzene. The benzene layer is washed with water, dried over anhydrous sodium sulfate and concentrated. The residue is admixed with an ethanolic solution of hydrochloric acid and concentrated. The residue is crystallized from a mixture of acetone and ether to give 2-[N-(3,3-diphenylpropyl)-N-methylamino]ethan-1-ol hydrochloride (2.1 g). M.P. 132° to 134°C.

EXAMPLE 4

Fine powder of 3-(3,3-diphenylpropylamino)propan-1-ol hydrochloride (250 g), lactose (350 g), purified microcrystalline cellulose (300 g), corn starch (50 g), anhydrous silicic acid (10 g), magnesium stearate (20 g) and hydrized castor oil (20 g) are uniformly mixed and tableted in a conventional manner to make 10,000 tablets (each weighing 100 mg), followed by sugar coating. EAch of the sugar coated tablets thus prepared contains 25 mg of the active ingredient.

EXAMPLE 5

3-(3,3-Diphenylpropylamino)propan-1-ol hydrochloride (4 g) is dissolved in distilled water (1000 ml) and filtered. EAch 2 ml of the solution is filled in an ampoule, which is then sterilized at 121°C for 20 minutes. Each of the ampoules thus obtained contains 8 mg of the active ingredient.

EXAMPLE 6

3-(3,3-Diphenylpropylamino)propan-1-ol hydrochloride (10 g) is dissolved in distilled water (2500 ml) and physiological saline solution (17500 ml) is added thereto. After filtration, each 100 ml of the solution is filled in an ampoule, which is then sterilized at 121°C for 20 minutes. Each of the ampoules thus obtained contains 50 mg of the active ingredient.

What is claimed is:

1. 3-[N-(3,3-Diphenylpropyl)-N-methylamino]propan-1-ol or a pharmaceutically acceptable acid-addition salt thereof.

* * * * *